United States Patent
Hull et al.

[15] 3,637,031
[45] Jan. 25, 1972

[54] DRILLING FLUID AND METHOD OF ROTARY DRILLING THEREWITH

[72] Inventors: Jerry D. Hull, Tulsa, Okla.; Robert E. Finch, Denver, Colo.

[73] Assignee: Standard Brands Chemical Industries, Inc., Dover, Del.

[22] Filed: Dec. 12, 1969

[21] Appl. No.: 884,718

[52] U.S. Cl. ...................175/66, 210/54, 252/8.5 A, 252/8.5 C
[51] Int. Cl. .....................B01d 21/01, C10m 3/30
[58] Field of Search ........175/65, 66; 166/275, 295; 252/8.5 A, 8.5 C; 210/54

[56] References Cited

UNITED STATES PATENTS

| | | | |
|---|---|---|---|
| 2,391,622 | 12/1945 | Dunn | 252/8.5 A |
| 2,775,557 | 12/1956 | Morgan | 252/8.5 C |
| 3,025,236 | 3/1962 | Barrett et al. | 252/8.5 C |
| 3,040,820 | 6/1962 | Gallus | 175/66 |
| 3,040,821 | 6/1962 | Widess | 175/66 |
| 3,122,203 | 2/1964 | Hawkins | 252/8.5 C UX |
| 3,323,603 | 6/1967 | Lummus et al. | 175/65 |
| 3,338,320 | 8/1967 | Gilson et al. | 175/65 |
| 3,434,970 | 3/1969 | Siegele et al. | 252/8.5 C |
| 3,472,325 | 10/1969 | Lummus | 252/8.5 C X |
| 3,516,932 | 6/1970 | Hedrick et al. | 210/54 X |

FOREIGN PATENTS OR APPLICATIONS

| | | | |
|---|---|---|---|
| 522,851 | 3/1956 | Canada | 252/8.5 C |
| 522,850 | 3/1956 | Canada | 252/8.5 C |

OTHER PUBLICATIONS

How to Reduce Fine Mud Solids for Better Drilling. In Oil & Gas J., Mar. 22, 1965, pp. 74– 77.

*Primary Examiner*—Ian A. Calvert
*Attorney*—Don O. Winslow and Aaron B. Karas

[57] ABSTRACT

Polyacrylamide homopolymer, in which the ratio of pendant amide groups to pendant carboxylic acid or carboxylic acid salt groups is between 130 and 500, is effective as either a selective or nonselective flocculation agent to remove cutting fines from aqueous rotary drilling fluids.

7 Claims, No Drawings

DRILLING FLUID AND METHOD OF ROTARY DRILLING THEREWITH

This invention relates to the production of petroleum by drilling and particularly to the drilling of oil wells by so-called clear water drilling methods. More particularly, the invention relates to the use of certain water-soluble organic polymers, which exhibit quite unexpected economic advantages as a component of clear water or low-solids drilling fluids.

In the drilling of oil wells by rotary drilling, it has long been standard practice to circulate a drilling fluid down through the hollow drill pipe, across the face of the drill bit and upward through the drill hole. The principal functions of this process are to wet and lubricate the bit and drill pipe and to clean the hole bottom by carrying away the cuttings. In certain instances, the drilling fluid may also serve to deposit an impermeable wall cake, to prevent caving of the formation from hydration of water-soluble shales and to overcome formation pressures. After passing through the well, the drilling fluid, containing bit cuttings and formation cavings, is treated to remove such solid materials and then recirculated to the well.

Drilling fluids include oils, water-in-oil emulsions, oil-in-water emulsions and predominantly aqueous fluids. Because of the multiplicity of functions which the drilling fluids must serve, they are usually comprised of a basic heat transfer and lubricating fluid in which is dispersed one or more additives to modify the properties of the basic fluid. Thus, depending upon the characteristics of the formation being drilled through and therefore the secondary functions which the drilling fluid must also serve, it may contain (1) materials to increase density, (2) materials to change viscosity, (3) materials to seal formations, (4) materials to reduce filtrate loss, (5) materials to counteract contaminants, (6) materials to stabilize shale and clays and other miscellaneous functional materials such as emulsifiers, corrosion inhibitors, bactericides, lubricants, and flocculants.

In the case of predominantly aqueous drilling fluids, with which this invention is primarily concerned, clays are most widely used to control the viscosity of the aqueous drilling fluid. However, it has been shown that the use of clay in the drilling fluids significantly reduces drilling rates and that the higher the clay content the lower the drilling rate. Thus, whenever the properties of a particular formation being drilled through permit, it is desirable to reduce the amount of clay as much as possible. In formations where it is unnecessary to seal the formation or to stabilize shale and clay, it is desirable to use so-called clear water drilling procedures. That is, the drilling fluid consists essentially of either salt water or fresh water. However, since even a small amount of salt or other solids significantly reduce penetration rate as compared to clear water, it is important to remove all drilled solids from the system. This is accomplished by the addition of flocculants, usually water-soluble organic polymers, which will flocculate all formation solids, including those which are bentonitic in nature. In the past, such "complete flocculants" have been water-soluble copolymers of acrylamide and a carboxylic acid such as an acrylic acid.

In the drilling of oil wells in which at least a small amount of clay is required, it is necessary to resort to the use of selective flocculants which will flocculate out drilled solids without removing the added bentonite. Vinyl acetate-maleic anhydride copolymers are most frequently used for this purpose.

Thus, if a minimum clay solids fluid ("low solids mud") is required, it is customary to use a selective flocculating agent such as vinyl acetate-maleic anhydride copolymer in order selectively to remove the low yield cuttings while maintaining the bentonite content of the mud, which is to be recirculated through the well. Such polymers are not, however, suitable for clear water drilling because they do not remove hydrophilic (high yield) clays which may have been cut from the formation.

Though the selection of flocculants to remove drilled solids seems prima facie a matter of course, many applications are not so straightforward. Frequently, in drilling down to the oil-bearing formation, it is necessary to pass through a plurality of strata some of which are susceptible to clear water drilling and others of which require mud. Thus, both clear water and low solids muds are used alternatively as drilling fluids in the same well. Under these conditions, the use of the nonselective acrylamide-carboxylic acid copolymer during clear water drilling must be suspended for at least about 10 hours and up to several days before mudding up can be accomplished. The reason for this is that residual amounts of the non-selective flocculant continue to flocculate out the deliberately added high yield clay during the mudding-up until the concentration of nonselective flocculant falls below effective flocculation levels.

These disadvantages of the prior art are overcome by the use in the drilling fluid of an essentially nonhydrolyzed homopolymer of acrylamide as a flocculating aid, which is capable of functioning both as a selective and nonselective flocculant in aqueous drilling fluids. Because of the unique ability of this polymer to function both as a selective and nonselective flocculating agent, it may be used in drilling operations in which either high yield (sodium bentonitic) strata or low yield nonbentonitic strata or both stratum types are encountered. Likewise, this polymer may be used advantageously in low-solids mud drilling. Thus, the use of the nonhydrolyzed polyacrylamide as a flocculant in drilling fluids has three aspects:

A. In clear water drilling
1. to remove high yield solids;
2. to remove both high and low yield solids; and B. In low-solids must drilling, to remove low yield solids selectively.

THE POLYMER

The essentially nonhydrolyzed homopolymer of acrylamide, which is used in accordance with the invention, may be produced by any of several methods known in the art, many of which involve polymerization of the dissolved acrylamide monomer in either a water-in-oil or oil-in-water emulsion, initiated by a redox catalyst system. Exemplary of such methods are those disclosed in U.S. Pat. Nos. 3,211,708, 2,982,749 and 2,983,717.

As mentioned hereinabove, it is important that the polyacrylamide be essentially nonhydrolyzed. By this is meant that only a very minor amount of the pendant amide groups are hydrolyzed to the carboxylic acid or carboxylic acid salt form. The ratio of unhydrolyzed amide groups to carboxylic acid or salt groups should be between 130 and 500 and preferably between 170 and 350. When acrylamide polymers having an amide-to-carboxylic acid ratio less than 130 are used or when copolymers of acrylamide and acrylic acid are used, the flocculation capability is adversely affected. Within this limited context, terms carboxylic acid and carboxylic acid salt are used interchangeably.

The molecular weight of the polymer should be between the limits of about 500,000 to about 10 million and preferably from about 1 million to about 4 million Outside these limits the flocculating ability of the polymer is severely reduced. By the term molecular weight is meant weight average molecular weight determined by calculation from the intrinsic viscosity of the polymer in $NaNO_3$ at 30° C. in accordance with the formula intrinsic viscosity $= 3.73 \times 10^4 \times$ (molecular weight)$^{0.66}$.

CLEAR WATER DRILLING

In conventional clear water drilling operations, the drilling fluid from the well is passed through mud screens or shakers to remove large sized cuttings, then through desanding equipment, such as cyclone separators, to remove smaller particles of cuttings and cavings. To the drilling fluid is then added a flocculating agent, after which the flocculant-containing fluid is passed to a settling tank wherein flocculation and settling of the very small particles takes place. The essentially clear water is then recirculated by means of the mud pump down-hole to the cutting face.

When the material removed from the face is of a nonbentonitic (low yield) nature, effective flocculation is obtained of low yield fines by mere addition of the polymer alone. When the material removed from the well is of mixed nature, i.e., comprising significant quantities of both bentonitic (high yield) and nonbentonitic (low yield) solids, only the low yield solids would be flocculated because of the selectivity of the nonhydrolyzed polyacrylamide. However, the polymer is rendered nonselective by first adding to the solids-containing water calcium ions in an amount at least sufficient to remove the adsorbed sodium ions from the surfaces of the high yield solids which are then effectively flocculated by the acrylamide polymer. A calcium level of about 150 p.p.m. is generally needed, a level of at least about 250 being preferred. The water, clarified in this manner, is then recirculated to the well. Depending upon the excess of calcium ions remaining in the water, additional amounts of calcium may be added from time to time to the solids-containing water coming from the well. The most convenient and economical method of adding calcium ions to the drilling fluid is by the addition of calcium chloride.

LOW-SOLIDS MUD DRILLING

The above-described polymer can also be used in the conventional manner as a flocculating agent for low-solids drilling muds in that it is an effective selective flocculating agent, i.e., it will flocculate out the low yield solids from the mud without significantly decreasing its bentonitic content. In this capacity alone, the polymer gives superior results in that rapid flocculation occurs and the material so removed is in the form of a dense, particulate mass.

Because of the excellent selectivity of the polymer, it is therefore possible to use it for clear water drilling and then to mud-up immediately without any delay. Therefore, if the preceding clear water drilling has been conducted without calcium addition, as described above, mud addition can be started and completed without further treatment of the water. On the other hand, if the preceding clear water drilling was conducted with calcium addition, which renders the polymer nonselective, the drilling fluid containing the polymer can be fully restored to its full selective flocculation capability merely by treating the water with carbonate ions to precipitate any calcium remaining in the water. Either sodium carbonate or sodium bicarbonate may be used for this purpose. Upon removal of the calcium in this manner, mudding-up can be accomplished forthwith. In both instances, the long delays in mudding-up inherent in the use of prior art nonselective flocculants for clear water drilling are avoided.

As used herein the term "low solids mud" refers to aqueous drilling fluids containing between from about 1 to about 6 percent by volume total solids, which may be comprised of both high and low yield solids, but is mainly bentonite.

The invention can best be viewed and understood by reference to the following examples:

EXAMPLE I

Two 100 ml. cylinders of water were prepared, both of which contained 4 percent by weight each of Rev dust, a low yield clay, and sodium bentonite. To one of the cylinders was added 1 ml. of a 0.5 percent weight solution of an essentially nonhydrolyzed polyacrylamide while to the other was added 1 ml. of a 1.0 percent weight solution of a commercially available polyacrylamide in which 1-2 percent of the amide groups are hydrolyzed.

Both polymers produced rapid flocculation. However, the 1-2 percent hydrolyzed polymer flocculated substantially the entire solids content of the water, whereas the nonhydrolyzed polymer produced settling only of the low yield Rev dust and the bentonite remained evenly dispersed. It is therefore apparent that the nonhydrolyzed polymer is a highly selective flocculant, which can be used for low-solids mud drilling in which bentonite is used.

EXAMPLE II

Two 100 ml. cylinders of water were again prepared, each containing 4 percent by weight of Rev dust and 4 percent by weight of sodium bentonite. To the first cylinder was added 1 ml. of a 1.0 percent aqueous solution of 1-2 percent hydrolyzed polyacrylamide. To the second cylinder, 250 p.p.m. of calcium as $CaCl_2$ was added, after which 1 ml. of 0.5 percent aqueous solution of the nonhydrolyzed polymer was added. This time essentially complete flocculation was obtained in body cylinders, i.e., both the high and low clays settled out. However, the flocculation rate for the nonhydrolyzed polyacrylamide was visibly more rapid and the water layer therefor had greater clarity at equal intervals of time.

By this test, it can be seen that the nonhydrolyzed polymer can, by means of prior calcium treatment, be used with comparable effectiveness as a nonselective flocculant. Consequently, the nonhydrolyzed polyacrylamide can be used for clear water drilling through both low yield and high yield formations.

EXAMPLE III

The clarified water, which had been treated with calcium in the experiment above, was treated with sodium carbonate to precipitate the calcium ions therefrom. To the thusly treated water was added 4 lb./bbl. of sodium bentonite which became readily dispersed and did not show any visible tendency to be flocculated out. The results of this sequence of tests indicates that upon the completion of clear water drilling, mudding-up can be accomplished readily without the necessity of working residual amounts of nonhydrolyzed acrylamide polymer from the system.

EXAMPLE IV

To the bentonite-containing water from the example immediately above was added 4 lb./bbl. of Rev dust and 1 ml. of a 0.5 percent weight aqueous solution of nonhydrolyzed polyacrylamide. This procedure, of course, is analogous to the pickup of low yield cuttings during low solids mud drilling. Upon polymer addition, the Rev dust was rapidly settled out, yet the bentonite remained in stable suspension, as in example I, hereinabove.

EXAMPLE V

A series of tests was run in which the flocculating capability of the essentially nonhydrolyzed polyacrylamide was observed on a variety of clay and shales. In this series, various amounts of a 0.5 percent by weight aqueous solution of the polymer were added to a 100 ml. graduated cylinder containing a 14 lb./bbl. suspension of the indicated clay or shale. Upon adding the polymer solution, the admixture was thoroughly shaken to insure complete dispersion, after which the time for the settling solids to fall to the 50 ml. mark was recorded.

TABLE 1

| Polymer concentration, lbs./100 bbls. $H_2O$ | Rev dust [1] | Atoka shale [2] | Anahuac shale [3] | Ireton shale [4] | Maroon fuson shale [5] |
| --- | --- | --- | --- | --- | --- |
| 0.44 | 17 | 9.5 | 23 | 18 | 34 |
| 0.88 | 7 | 9 | 12.5 | 13.5 | 18.5 |
| 1.76 | 5.5 | 8 | 6.5 | 7 | 7 |
| 2.64 | 5.5 | 7 | 3 | 1 | 5.5 |
| 3.52 | 8 | 9 | 1.5 | 1 | 5 |
| 4.40 | 9 | 10 | 1.5 | 1 | 4.5 |
| 5.28 | 12 | 11 | 2 | 1 | 4.5 |
| 7.04 | 15.5 | 16 | 3 | 1 | 7.5 |

[1] Low yield clay from East Texas.
[2] Low yield shale from Oklahoma.
[3] Low yield shale from Louisiana.
[4] Low yield shale from Alberta, Canada.
[5] Shale from Wyoming, 30 cation exchange capacity, 250 p.p.m. $Ca^{++}$ added as $CaCl_2$ prior to polymer addition.

The foregoing results show that the polymer was quite effective in settling out each of the low yield materials and that, by addition of calcium ions, the high yield shale was totally flocculated as well. Though the flocculatability of each of the materials varied greatly, as would be expected, nevertheless rapid settling rates were obtained in all cases at concentrations of only 1.0 lb. per 100 bbl. of water (0.003 percent by weight). Moreover, no significant additional flocculation was obtained beyond concentrations of about 3.5 lb. per 100 bbl. and in most instances beyond 2.5 lb. per 100 bbl. It is noteworthy, too, that the settling rates for the calcium-treated high yield Maroon Fuson shale was only about 5 seconds at a polymer concentration of 2 lb./100 bbl. Thus, polymer concentrations of from 0.5–5 lb./100 bbl. and especially 1–3.5 lb./100 bbl. are preferred.

EXAMPLE VI

In this series of tests, the flocculation capability and selectively of the polymer of the invention was compared with two commonly available polymers, which are used in clear water and low-solids drilling, respectively. Polymer A is a vinyl acetate/maleic anhydride copolymer such as is disclosed in U.S. Pat. No. 3,070,543 and polymer B is a copolymer of acrylamide and acrylic acid, in which the ratio of amide groups to acrylic acid is between 10 and 120, such as is disclosed in U.S. Pat. No. 3,040,820.

Three 100 ml. cylinders of water were prepared in which a mixture of bentonite and low yield clay was suspended. To one cylinder was added 1 ml. of a 0.5 solution of essentially nonhydrolyzed polyacrylamide (ratio of amide-to-acid groups about 300). To one of the other two cylinders was added 1 ml. of a 1 percent solution of polymer A and to the remaining cylinder 1 ml. of a 1 percent solution of polymer B. All three cylinders were then shaken to obtain complete dispersion of the solids and allowed to settle.

In the cylinder containing polymer A, the bentonite remained in suspension while the low yield clay was flocculated out rapidly, but in the form of loose granular layer which was easily redispersed.

In the cylinder containing polymer B, the entire amount of dispersed solids was flocculated out fairly rapidly.

In the cylinder containing the polymer of the invention, the bentonite remained in suspension while the low yield clay only was flocculated out. The flocculation rate was about the same as polymer A and more rapid than polymer B. Moreover, the flocculated layer was desirably more dense and more difficult to redisperse than polymer A. Thus, the essentially nonhydrolyzed polyacrylamide exhibited both excellent selectivity and flocculation capability.

EXAMPLE VII

In drilling a well in the Foremost field of Alberta, Canada, clear water drilling was begun at 605 feet using nonhydrolyzed polyacrylamide as a flocculant. No calcium was added to the drilling fluid. Because the formation contained a relatively small amount of high yield clay, the drilling fluid built up to a solids level of about 2 percent volume, at 1,900 feet depth. The drilling fluid was readily mudded up by addition of sodium bentonite and drilling was continued to 3,100 feet using as drilling fluid a high-solids mud containing 13 percent volume solids. At 3,100 feet, clear water drilling was resumed again using nonhydrolyzed polyacrylamide as flocculant. This time, however, calcium (lime) was added to the drilling fluid since the formation shale contained 5 percent bentonite. Drilling was continued to about 4,200 feet without any buildup of solids in the drilling fluid. At this level, the drilling fluid was treated with soda ash to remove the calcium and again the drilling fluid was mudded up, this time to a level of 7 percent volume solids. The well was then drilled to a completion depth of 4,250 feet using a vinyl acetate-maleic anhydride polymer as flocculating and clay-beneficiating agent. The second mud-up was accomplished readily and no tendency of the bentonite to flocculate out was observed. Furthermore, the nonhydrolyzed polyacrylamide remaining in the system did not in any way interfere with the beneficiating action of the vinyl acetate-maleic anhydride polymer.

EXAMPLE VIII

In drilling a well in the Crossfield field of Alberta, Canada, clear water drilling was begun at 600 feet using nonhydrolyzed polyacrylamide as a flocculating agent. Because the formation being drilled through contained high yield clay, lime was added to the drilling fluid to a level of 240 p.p.m. $Ca^{++}$. The solids content of the drilling fluid dropped to essentially zero. While maintaining a $Ca^{++}$ concentration of 360 p.p.m. $Ca^{++}$ in the water by periodic addition of more lime and by periodic addition of essentially nonhydrolyzed polyacrylamide, the weight of the drilling fluid was maintained at 8.34 lb./gal. Between 7,000 and 7,150 feet depths, lime addition was discontinued and soda ash was added to reduce the calcium level to 60 p.p.m. The water was then mudded up to a level of 3 percent volume solids by addition of bentonite and drilling was continued without further addition of bentonite to a level of 7,500 feet. During the last 350 feet, vinyl acetate-maleic anhydride polymer was used as a primary flocculant and clay-beneficiating agent and the solids content of the drilling fluid rose to 4 percent volume (9.0 lb./gal.). This, of course, indicates that the residual amount of polyacrylamide in the system was restored to full selectivity by the soda ash treatment and that other conventional water-soluble polymeric flocculating agents are fully effective when used in admixture with the nonhydrolyzed polyacrylamide of the invention.

It should be noted in the foregoing examples that the nonhydrolyzed polyacrylamide, when used within the recommended range of concentration, does not appreciably thicken the water or, in the case of low solids drilling fluids, increase the yield of bentonite.

What is claimed is:

1. In the process of oil well rotary drilling in which essentially clear water is used as a drilling fluid to cool the cutting bit and to carry cuttings from the borehole to the surface, whereupon finely divided particles of cuttings are removed from the water by means of flocculation and settling, the improvement which comprises adding to the water containing low yield cuttings coming from the well a flocculating amount of an essentially nonhydrolyzed acrylamide homopolymer having an average molecular weight of from about 500,000 to about 10 million and in which the ratio of pendant amide moieties to pendant acid moieties is from about 130 to about 500 to flocculate selectively the low yield cuttings therefrom, settling out the thusly flocculated solids and recirculating the water, from which the low yield cuttings have been removed, to the borehole.

2. The process of claim 1, in which the cuttings removed from the borehole comprise both high and low yield solids and the water is treated with calcium ions prior to addition of the acrylamide homopolymer to remove the adsorbed sodium ions from the high yield solids, upon which addition both high and low yield solids are nonselectively removed from the water.

3. The process of claim 2, in which, following removal of the low and high yield solids from the water, the calcium ions contained in the water are removed by chemical precipitation prior to recirculation of the water to the borehole.

4. A drilling fluid composition comprising water having dissolved therein from about 0.5 to about 5 lb. per 100 barrels of an acrylamide homopolymer having a molecular weight of from about 500,000 to about 10 million, the ratio of pendant amide moieties to pendant acid moieties in the homopolymer being from about 130 to about 500.

5. The drilling fluid composition of claim 4 in which the water contains dispersed therein from about 1 to about 6 percent by volume of sodium bentonite clay.

6. The drilling fluid composition of claim 4 in which the water contains dissolved therein at least 150 p.p.m. of calcium ions.

7. In the process of oil well rotary drilling in which a low solids mud is used as a drilling fluid to cool the cutting bit and to carry cuttings from the borehole to the surface, whereupon finely divided particles of cuttings are removed from the water by means of flocculation and settling, the improvement which comprises adding to the low solids mud containing cuttings coming from the well a flocculating amount of an essentially nonhydrolyzed acrylamide homopolymer having an average molecular weight of from about 500,000 to about 10 million and in which the ratio of pendant amide moieties to pendant acid moieties is from about 130 to about 500 to flocculate selectively the low yield cuttings therefrom, settling out the thusly flocculated low yield solids and recirculating the low solids mud, from which the low yield solids have been removed, to the borehole.

* * * * *

UNITED STATES PATENT OFFICE
CERTIFICATE OF CORRECTION

Patent No. 3,637,031　　　　　　　Dated January 25, 1972

Inventor(s) Jerry D. Hull, et. al.

It is certified that error appears in the above-identified patent and that said Letters Patent are hereby corrected as shown below:

Column 2, line 30, "must" should read -- mud -- . Column 4, line 11, "body" should read -- both -- .

Signed and sealed this 12th day of December 1972.

(SEAL)
Attest:

EDWARD M. FLETCHER, JR.　　　　　　ROBERT GOTTSCHALK
Attesting Officer　　　　　　　　　Commissioner of Patents